US011940832B2

(12) United States Patent
Rose et al.

(10) Patent No.: US 11,940,832 B2
(45) Date of Patent: Mar. 26, 2024

(54) PREDICTING A BANDGAP REFERENCE OUTPUT VOLTAGE BASED ON A MODEL TO TRIM A BANDGAP REFERENCE CIRCUIT

(71) Applicant: NXP B.V., Eindhoven (NL)

(72) Inventors: Matthias Rose, Helmond (NL); Maxim Kulesh, Hamburg (DE); Neha Goel, Doraha (IN)

(73) Assignee: NXP B.V., Eindhoven (NL)

( * ) Notice: Subject to any disclaimer, the term of this patent is extended or adjusted under 35 U.S.C. 154(b) by 335 days.

(21) Appl. No.: 17/452,602

(22) Filed: Oct. 28, 2021

(65) Prior Publication Data

US 2023/0139554 A1 May 4, 2023

(51) Int. Cl.
*G05F 3/30* (2006.01)

(52) U.S. Cl.
CPC .................................... *G05F 3/30* (2013.01)

(58) Field of Classification Search
CPC ... G05F 3/30; G05F 3/26; G05F 3/262; G05F 3/265; G05F 3/267; G05F 3/08; G05F 3/16; G05F 3/22; G05F 3/222; G05F 3/225; G05F 3/24; G05F 3/242; G05F 3/245; G05F 1/10; G05F 1/46; G05F 1/462; G05F 1/56; G05F 1/561; G05F 1/563; G05F 1/567
See application file for complete search history.

(56) References Cited

U.S. PATENT DOCUMENTS

| | | | | |
|---|---|---|---|---|
| 5,440,305 | A | 8/1995 | Signore et al. | |
| 5,629,612 | A | 5/1997 | Schaffer | |
| 6,183,131 | B1 | 2/2001 | Holloway et al. | |
| 8,988,137 | B2 | 3/2015 | Furusawa et al. | |
| 10,013,013 | B1 * | 7/2018 | Wortel | H03F 3/45475 |
| 2006/0061412 | A1 | 3/2006 | Molina et al. | |
| 2008/0106236 | A1 | 5/2008 | Gaggl | |
| 2018/0101190 | A1 * | 4/2018 | Lee | G05F 3/262 |
| 2018/0292271 | A1 * | 10/2018 | Ma | G01R 35/005 |
| 2019/0181103 | A1 * | 6/2019 | Shieh | H01L 23/58 |
| 2020/0183440 | A1 * | 6/2020 | Rasmus | G05F 3/30 |
| 2022/0299378 | A1 * | 9/2022 | Yang | G11C 5/147 |

* cited by examiner

*Primary Examiner* — Thienvu V Tran
*Assistant Examiner* — Shahzeb K Ahmad

(57) ABSTRACT

A first error is determined between a bandgap reference output voltage of a bandgap reference circuit at a first temperature and a target voltage. A second temperature of the bandgap reference circuit is measured. A bandgap reference output voltage of the bandgap reference circuit is predicted at the second temperature and based on the first error. A second error is determined between the bandgap reference output voltage and the target voltage. A trim parameter of the bandgap reference circuit is determined based on the second error. The bandgap reference circuit is set with the trim parameter, where a third error between a bandgap reference output voltage of the bandgap reference with the trim parameter is less than the second error.

20 Claims, 6 Drawing Sheets

PREDICTING A BANDGAP REFERENCE OUTPUT VOLTAGE BASED ON A MODEL TO TRIM A BANDGAP REFERENCE CIRCUIT

FIELD OF USE

This disclosure generally relates to a bandgap reference circuit, and more particularly to predicting a bandgap reference output voltage based on a model to trim a bandgap reference circuit.

BACKGROUND

A conventional bandgap reference circuit outputs a voltage with a relatively low temperature sensitivity or temperature dependency based on a bandgap principle. The bandgap principle involves adding voltages from a circuit section of the bandgap reference circuit having a positive temperature coefficient and a circuit section of the bandgap reference circuit having a negative temperature coefficient such that the output voltage of the bandgap reference circuit has a relatively low or negligible temperature coefficient. In a particular bandgap reference circuit, a PTAT voltage (positive to absolute temperature) based on a positive temperature coefficient is added to a so-called NTAT voltage (negative to absolute temperature) based on a negative temperature coefficient. In an example, the PTAT voltage is obtained as a voltage difference between two bipolar transistors which are operated with different current densities, whereas the NTAT voltage is obtained as a base-emitter voltage of a bipolar transistor.

The bandgap reference circuit serves as a voltage reference for other electronic circuits such as voltage regulators. The electronic circuits rely on the bandgap reference circuit to provide a constant target voltage over temperature, but the output voltage of the bandgap reference circuit might vary in practice. To reduce this variation, the bandgap reference circuit is trimmed. A trimming process could include adjusting resistance of resistors or current of current sources in the bandgap reference circuit, for example, during a production test of the bandgap reference circuit. The production test involves trimming the bandgap reference circuit at a single temperature to cause the bandgap reference circuit to output the target voltage at the single temperature.

Figure 1:
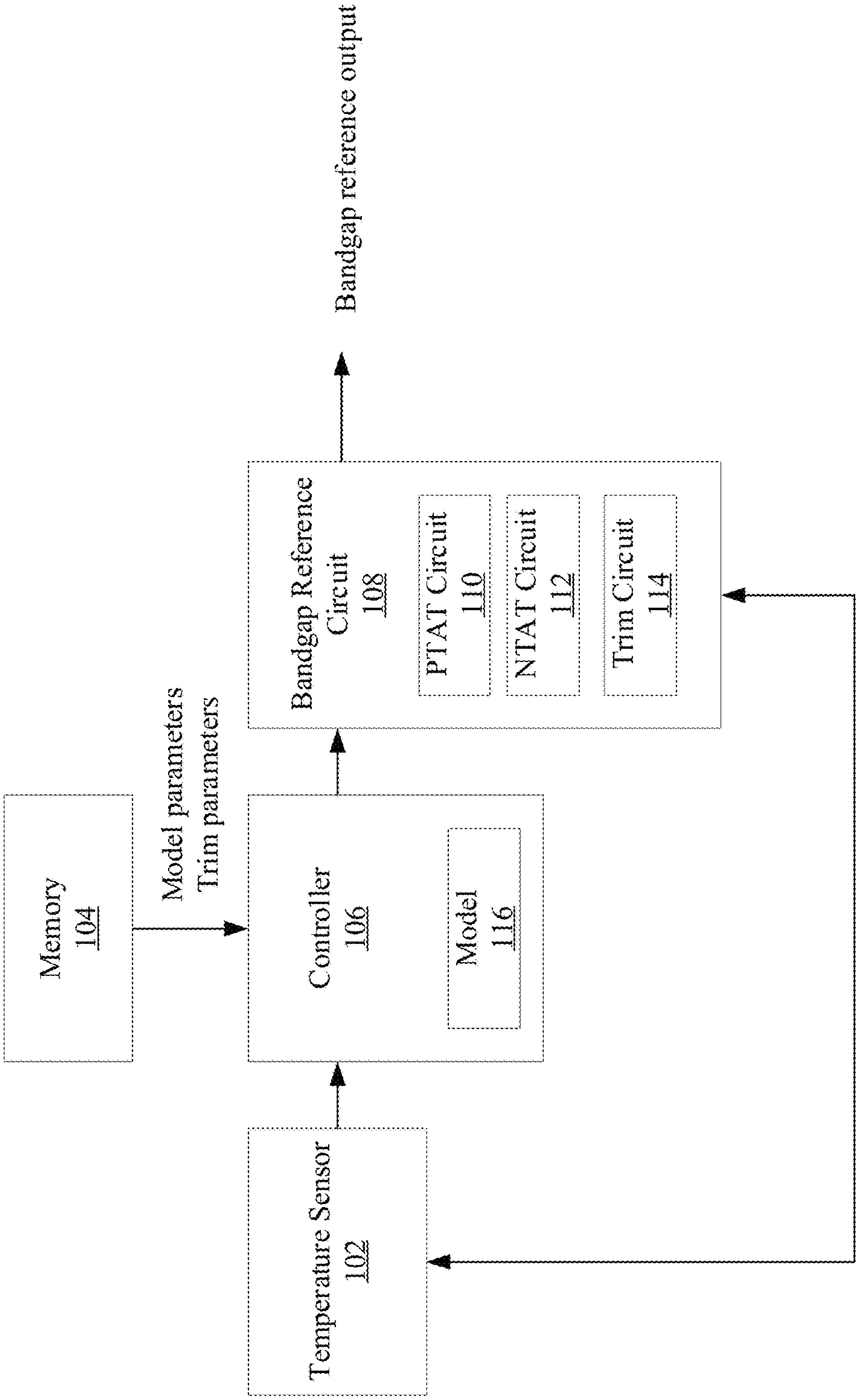
FIG. 1 is an example block diagram of a system for predicting a bandgap reference output voltage based on a model to trim a bandgap reference circuit in accordance with an exemplary embodiment of the invention.

The drawings are for the purpose of illustrating example embodiments, but it is understood that the embodiments are not limited to the arrangements and instrumentality shown in the drawings.

DETAILED DESCRIPTION

A bandgap reference circuit should output a voltage equal to a target voltage over a temperature range such as −40 degrees Celsius to 150 degrees Celsius. Further, the bandgap reference circuit is trimmed at a single temperature such as 125 or 150 degrees Celsius during a production test. The trimming during the production test reduces an error between the output voltage and the target voltage to substantially zero at the single temperature (where substantially zero depends on a resolution of the output voltage), but in practice the error might not be reduced by such an amount at other temperatures due to a curvature of the bandgap reference output voltage as a function of temperature.

Embodiments disclosed herein are directed to predicting a bandgap reference output voltage based on a model to trim a bandgap reference circuit. In an example, the prediction is based on modeling a curvature of the bandgap reference output voltage as a function of temperature as a second order or higher order model and trimming the bandgap reference circuit in a production test and in actual use. The production test is performed during production of a wafer having the bandgap reference circuit while the actual use is operation of the bandgap reference circuit in a field where temperature of the bandgap reference circuit might vary. During the production test, model parameters are determined such as an error between a bandgap reference output voltage before trimming and the target reference voltage at a production test temperature to determine coefficients of the model. Trim parameters of the bandgap reference circuit are then determined for the bandgap reference circuit operating at a production test temperature so that the bandgap reference circuit outputs the target voltage. The trim parameters are stored in a memory such as a flash memory or one-time programmable memory (OTP). During the actual use, the bandgap reference circuit is initially trimmed with the stored trim parameters. Further, a temperature of the bandgap reference circuit is measured and based on the model parameters and the measured temperature, the bandgap reference circuit uses the model to predict a bandgap reference output voltage of the bandgap reference circuit arranged with the stored trim parameters. The trim parameters determined during the production test procedure are adjusted based on the predicted bandgap reference output voltage to reduce an error between a bandgap reference output voltage of the bandgap reference circuit configured with the adjusted trim parameters and the target voltage. This process is repeated as the temperature of the bandgap reference circuit changes. For example, the process may be repeated if the temperature increases or decreases by a predetermined amount. In another example, the process is repeated periodically such as every three seconds. The bandgap reference circuit uses the model to reduce the error from an original+/−1.5% error to +/−0.45% error based on simulations using the model.

FIG. 1 is an example block diagram of a system 100 for predicting a bandgap reference output voltage based on a model to trim a bandgap reference circuit in accordance with an exemplary embodiment of the invention. The system 100 includes a temperature sensor 102, a memory 104 such as a one-time programmable memory or flash memory, a controller 106, and a bandgap reference circuit 108 each implemented using circuitry such as analog circuitry, mix signal circuitry, memory circuitry, logic circuitry, and/or processing circuitry arranged to execute code stored in a memory and when executed by the processing circuitry perform the disclosed functions, or combinations thereof.

In an example, the bandgap reference circuit 108 may output a bandgap reference output voltage with a relatively low temperature sensitivity or temperature dependency based on a bandgap principle. The bandgap principle involves adding voltages from a circuit section 110 having a positive temperature coefficient and a circuit section 112 having a negative temperature coefficient. In a particular bandgap reference circuit, a PTAT voltage (positive to absolute temperature) based on a positive temperature coefficient is added to a NTAT voltage (negative to absolute temperature) based on a negative temperature coefficient in such a way that the resulting output voltage by the bandgap reference circuit 108 has the relatively low or negligible temperature coefficient.

The bandgap reference output voltage by the bandgap reference circuit 108 should be a constant target voltage despite variations in temperature, but the output voltage of the bandgap reference circuit 108 could actually vary from the target voltage with temperature. The difference is an error between the output voltage and the target voltage which results from process variations in the bandgap reference circuit 108. The production test may have access to a known reference voltage so as to measure the bandgap reference output voltage. To reduce this error, the bandgap reference circuit 108 may be trimmed in a trimming process by adjusting one or more trim parameters of the bandgap reference circuit 108. For example, the bandgap reference circuit 108 may have a trim circuit 114 such as a resistor ladder with programmable resistance for controlling current or voltages in the bandgap reference circuit 108. In an example, a digital code may such as a four bit code may be applied to a control circuit of the resistor ladder to set the resistance of the resistor ladder which causes the bandgap reference circuit to output a voltage based on the digital code. Further, the resistance may be changed in discrete steps where each step causes the bandgap reference output voltage to change by a predetermined voltage. Based on the change, the error between the bandgap reference output voltage and the target voltage and the bandgap reference circuit 108 may be reduced. For example, changing the code by one step from 0001 to 0010 which represents a change in resistance of 7.2 kohm may cause the output voltage to change by 0.004 volts and error to be reduced. The digital code may be an example of a trim parameter of the bandgap reference circuit 108 which is adjusted. The trim parameter may take other forms as well including adjustment of current of a current source. In an example, the trim setting may be stored in the memory 104.

An error between a bandgap reference output voltage and a target voltage may be substantially zero at the temperature where the bandgap reference circuit 108 is trimmed. But the error may increase with other temperatures of the bandgap reference such as from −40 degrees Celsius to 150 degrees Celsius associated with automotive applications for a same trim setting resulting in the error varying with temperature.

Embodiments disclosed herein are directed to predicting a bandgap reference output voltage based on the model 116 to trim the bandgap reference circuit 108. During production of the bandgap reference circuit 108 such as wafer test, the controller 106 may determine an error between a target voltage and a bandgap reference output voltage by the bandgap reference circuit 108. The error may be measured at a production test temperature such as 125 degrees or 150 degrees Celsius. The memory 104 may store the one or more model parameters such as the error in the memory 104 or coefficients of the model determined based on the error. Trim parameters of the bandgap reference circuit 108 may then be determined for the bandgap reference circuit 108 operating at a production test temperature so that the bandgap reference circuit 108 outputs the target voltage at the production test temperature. The trim parameters may be also stored in the memory 104.

During actual use of the bandgap reference circuit 108 in the field, the bandgap reference circuit 108 may be initially trimmed with the stored trim parameters. Further, the controller 106 may receive the model parameters stored in the memory 104. The controller 106 may use the model parameters stored in the memory 104 to define the model 116 which predicts a bandgap reference output voltage as a function of temperature. The model 116 may be used to predict the bandgap reference output voltage as a function of the temperature rather than a direct measurement because there is no known reference voltage available to measure the bandgap reference output voltage. Further, the temperature sensor 102 may measure a temperature of the bandgap reference circuit 108 such as at a PN junction of the bandgap reference circuit 108. The controller 106 may receive the temperature of the bandgap reference from the temperature sensor 102 and use the model 116 to predict a bandgap reference output voltage of the bandgap reference circuit 108 at the temperature. The trim parameters determined during the production test procedure are adjusted based on the predicted bandgap reference output voltage to reduce the error between a bandgap reference output voltage and the target voltage when the bandgap reference circuit 108 is trimmed with the adjusted trim parameters.

Figure 2:
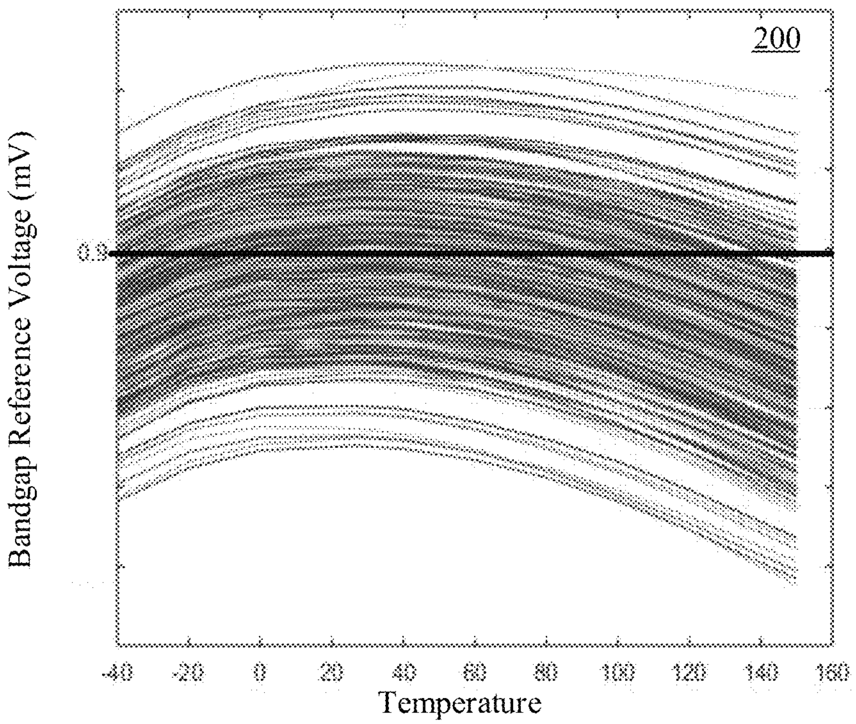
FIG. 2 illustrates example plots of a bandgap reference output voltage as a function of temperature in accordance with an exemplary embodiment of the invention.
Figure 2:
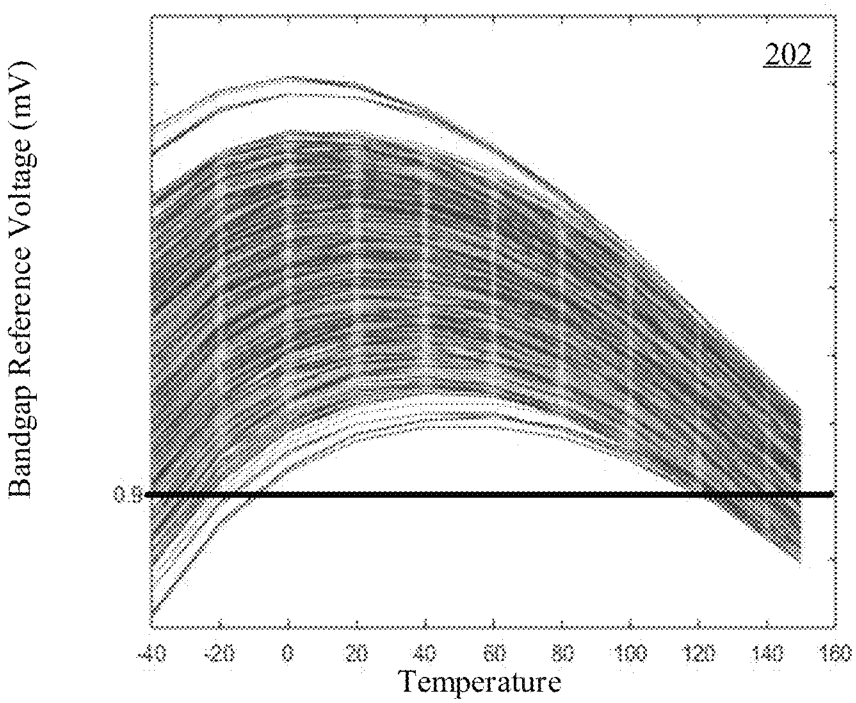

FIG. 2 illustrates example plots 200, 202 of a bandgap reference output voltage as a function of temperature based on simulating operation of a plurality of samples of different bandgap reference circuits (i.e., bandgap reference circuits each with different process parameters such as critical dimensions, electrical performance requirements, and other device characteristics) in accordance with an exemplary embodiment of the invention. Each curve of the plots 200, 202 may represent a bandgap reference output voltage by a respective bandgap reference circuit over temperature. In an example, the process parameters of each bandgap reference circuit may be varied in accordance with a Monte Carlo simulation and a bandgap reference output voltage as a function of temperature determined for each sample.

The plots 200, 202 show that a bandgap reference output voltage changes with temperature from a target voltage and has a voltage spread as a function of temperature across samples of the bandgap reference circuits. In this example, the target voltage is 900 mV. Plot 200 illustrates the change from the target voltage as function of temperature and the voltage spread before the bandgap reference circuit is trimmed at a production temperature such as 150 degrees Celsius. Plot 202 illustrates the change from the target voltage as function of temperature and voltage spread after the bandgap reference circuit is trimmed at a production temperature such as 150 degrees Celsius. Trimming of the bandgap reference circuit reduces error between a bandgap reference voltage and the target voltage to approximately +/−1.5% from the target voltage of 900 mV. The trimming also results in a worst case voltage spread at −40 degrees Celsius.

Trimming of the bandgap reference circuit based on the model 116 reduces further error between a bandgap reference voltage and the target voltage as a function of temperature. In an example, the model 116 may be a mathematical model which describes the operation of the bandgap reference circuit 108 in terms of a second order or higher order mathematical relationship between a bandgap reference output voltage and the temperature based on a predictor function. The model 116 may be used to predict the bandgap reference output voltage based on a temperature of the bandgap reference circuit 108.

The model 116 may have various model parameters which are unknown but estimated from the simulation of plot 200. For example, the model 116 may be represented by a polynomial model such as a third order non-linear model:

$$V_{out}-V_{ref}*(K_0(dV)+K_1(dV)*T_{norm}+K_2(dV)*T_{norm}^2+K_2(dV)*T_{norm}^3)$$

and model parameters determined by a polynomial regression which represents a mean curvature of the plot 200. The following model parameters may be determined:

$K_0$, $K_1$, $K_2$, $K_3$ which are coefficients of the model 116. In one example, the coefficients may be fixed values determined based on a polynomial regression performed on the plot 200. In another example, the coefficients may be a function of an error between a bandgap reference output voltage and the target voltage $V_{ref}$ (in this example 900 mV). The error may be represented as:

$$dV=V(@150°\ C.)-V_{ref}$$

$V_{ref}$: may be an ideal or target voltage (in this example 900 mV). In an example, the model coefficients may comprise:

$$K0(1/C):\ c1+c2*dV$$

$$K1(1/C):\ c3+c4*dV$$

$$K2(1/C):\ c5+c6*dV$$

$$K3(1/C):\ c7+c8*dV$$

where c1 to c8 are positive or negative coefficients determined during the polynomial regression and $T_{norm}$ may be a normalized temperature measured with an on-chip temperature sensor represented in an example as:

$$T_{norm}=(T-50°\ C.)/90°\ C.$$

In an example, the controller 106 may input the model parameters $K_0$, $K_1$, $K_2$, $K_3$, the error dV, and the temperature of the bandgap reference circuit into the model 116 which predicts the bandgap reference output voltage.

Figure 3:
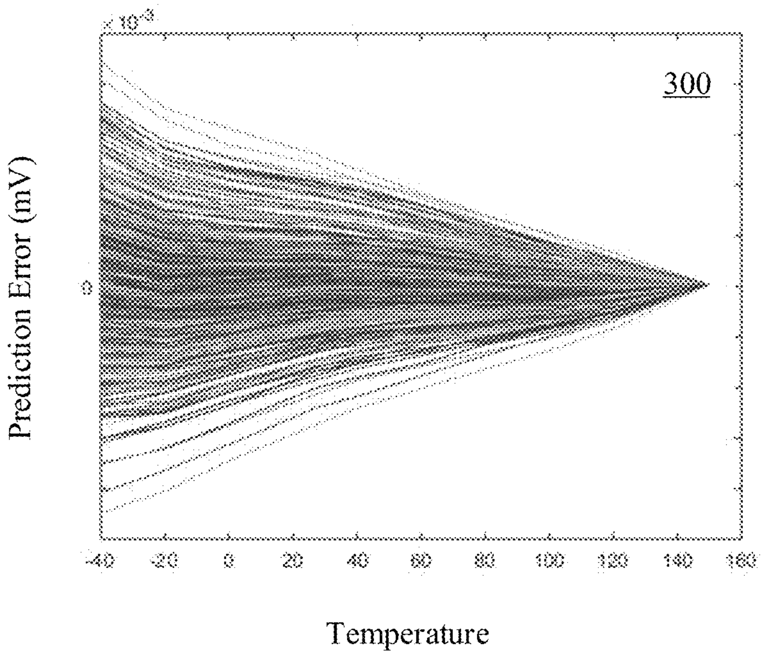
FIG. 3 illustrates example plots of a prediction error of the model in accordance with an exemplary embodiment of the invention.
Figure 3:
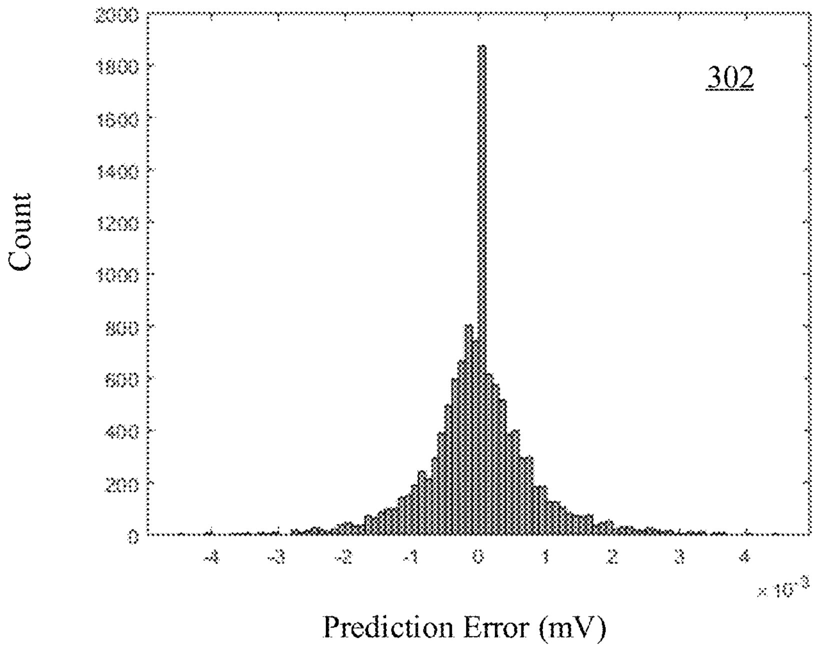

FIG. 3 illustrates example plots of a prediction error of the model 116 in accordance with an exemplary embodiment of the invention. The prediction error may be indicated by a difference between a bandgap reference output voltage predicted based on the model 116 and a bandgap reference output voltage indicated by plot 202 as a function of temperature. Plot 300 shows a prediction error in mV as a function of temperature where the error increases as the temperature moves away from the production test temperature with no outliers. Plot 302 shows a distribution of the prediction error in mV with a maximum number of errors being close to zero with no imbalance. Further, the plots 300, 302 indicate that the prediction error ranges in the prediction by the model ranges from 0.44% to −0.45%.

The model 116 of curvature of the bandgap reference output voltage by the bandgap reference circuit as a function of temperature may take many forms including a non linear function as described above. In some examples, the model 116 may take the form of a neural network with one or more layers. One or more layers in the neural network may represent non-linear function which in combination with other layers produce results such as a prediction of bandgap reference output voltage by the bandgap reference circuit 108. Model parameters of the neural network may be defined during a training process of the neural network using data from the simulations or actual data collected during operation of the bandgap reference circuit 108.

The model 116 is able to predict the bandgap reference output voltage as a function of temperature. The model 116 may be used to reduce the error between a bandgap reference output voltage and a target voltage over temperature during actual use of the bandgap reference circuit 108 outside of a manufacturing context, e.g., in the field.

Figure 4:
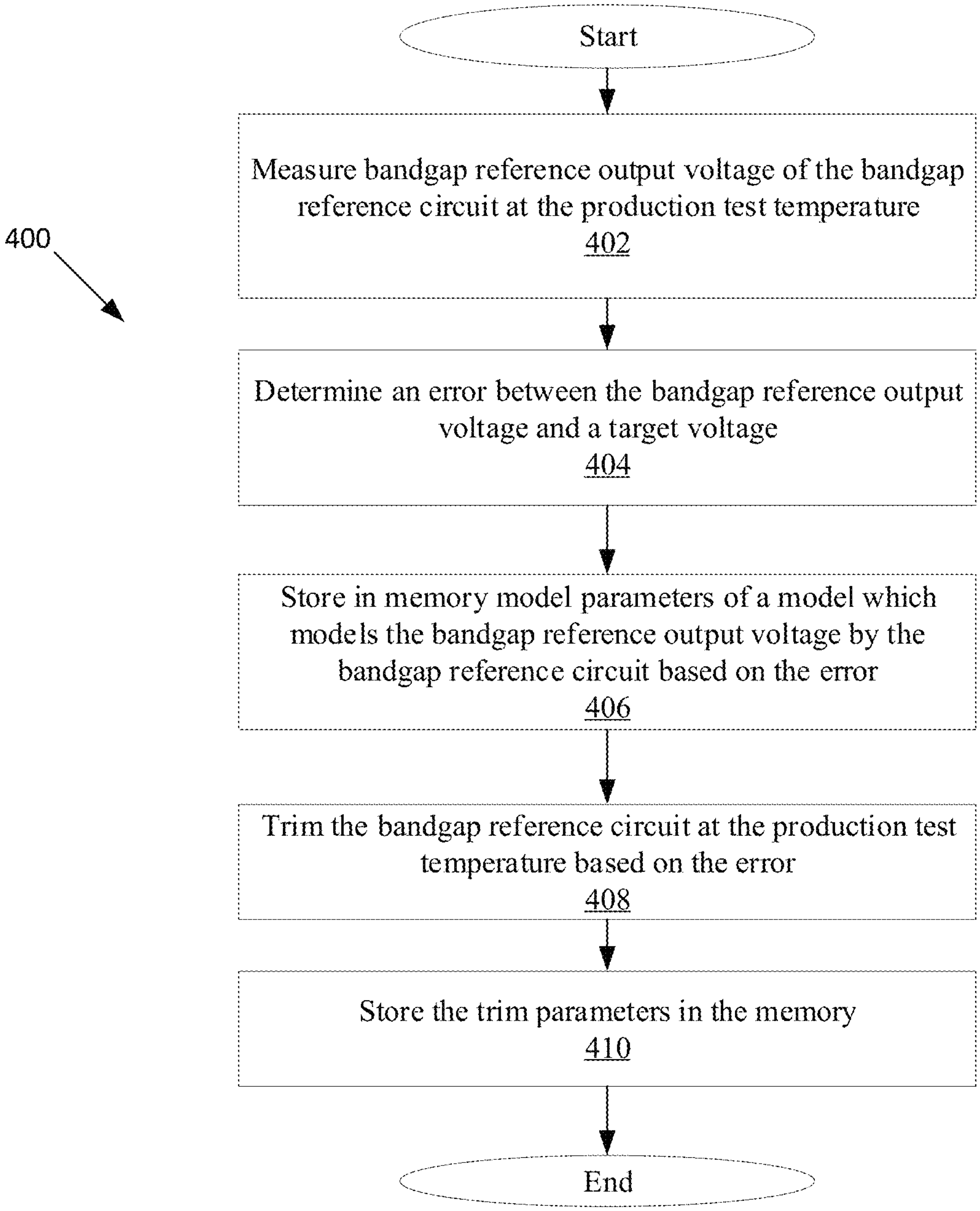
FIG. 4 is an example flow chart of functions associated with configuring the bandgap reference circuit during a production test in accordance with an exemplary embodiment of the invention.

FIG. 4 is an example flow chart of functions 400 associated with trimming the bandgap reference circuit 108 during the production test of the bandgap reference circuit 108 in accordance with an exemplary embodiment of the invention. In an example, the controller 106 may perform the functions 400. The production test may be performed during manufacture of the bandgap reference circuit 108. In an example, the production test temperature may be 125 degrees or 150 degrees Celsius. At 402, a bandgap reference output voltage is measured for the bandgap reference circuit 108 at the production test temperature. In an example, the production test temperature may be measured at a PN junction of the bandgap reference circuit 108. At 404, an error dV is determined between the bandgap reference output voltage and a target voltage. The production test may have access to a known reference voltage so as to measure the bandgap reference output voltage. At 406, model parameters of a model 116 which models a bandgap reference output voltage by the bandgap reference circuit 108 as a function of temperature is stored in the memory 104 based on the error. The model parameters may include the error dV or coefficients of the model 116 determined based on the error. At 408, the bandgap reference circuit 108 is trimmed at the production test temperature based on the error. The trimming process may comprise determining trim parameters such as a code indicative of resistance of a resistor ladder to change the bandgap reference output voltage by the error at the production test temperature. The code may be adjusted in discrete steps where each step corresponds to a predetermined voltage change ΔV. In an example, the trim parameters may be adjusted by a maximum number of discrete steps $n_{max}$ such that $n_{max}*\Delta V<\text{error}$ is satisfied. The code may be increased by n steps or decreased by n steps depending on whether the error is positive or negative. For example, if the error is positive meaning the bandgap reference output voltage is higher than the target voltage, then the code may be adjusted upward to increase resistance and decrease the bandgap reference output voltage. As another example, if the error is negative meaning the bandgap reference output voltage is lower than the target voltage, then the code may be adjusted downward to reduce resistance and increase the bandgap reference output voltage. Other variations are also possible. At 410, the trim parameters may be stored in the memory 104.

Figure 5:
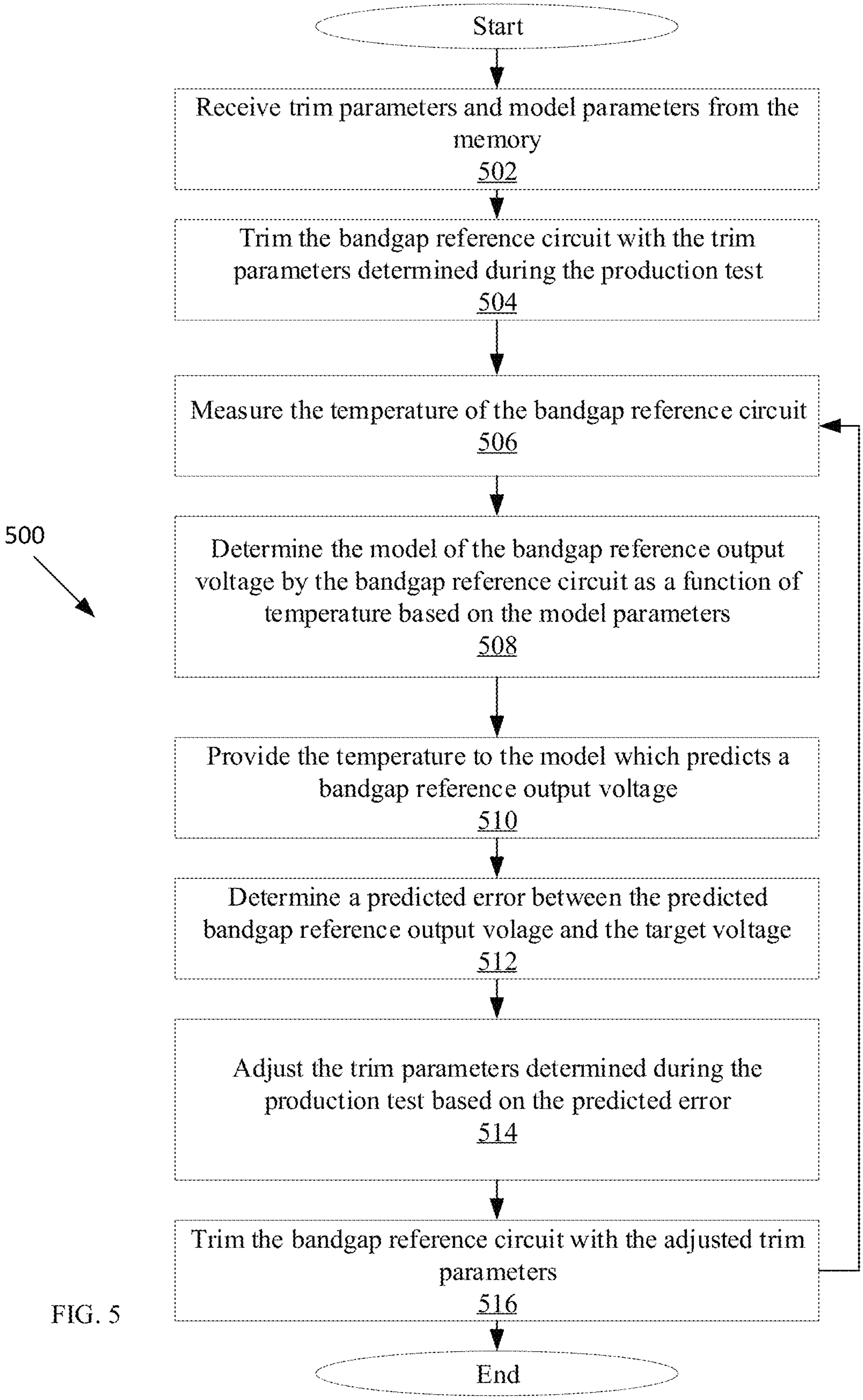
FIG. 5 is an example flow chart of functions associated with trimming the bandgap reference circuit during actual use based on the model in accordance with an exemplary embodiment of the invention.

FIG. 5 is an example flow chart of functions associated with trimming the bandgap reference circuit 108 during use based on the model in accordance with an exemplary embodiment of the invention. The use may refer to operation of the bandgap reference circuit 108 in a field such as in a product such as a radar circuit. In an example, the controller 106 may perform the functions 500. At 502, the trim parameters and model parameters are received from the memory 104. At 504, the bandgap reference circuit 108 is trimmed with the trim parameters determined during the production test. At 506, a temperature of the bandgap reference circuit 108 is measured. The temperature may be measured by the temperature sensor 102. At 508, a model 116 of a bandgap reference output voltage by the bandgap reference circuit 108 as a function of temperature is determined based on the model parameters. At 510, the temperature is provided to the model 116 which predicts a bandgap reference output voltage. The model 116 may be used to predict the bandgap reference output voltage as a function of the temperature rather than a direct measurement because there is no known reference voltage available to measure the bandgap reference output voltage. At 512, a predicted error between the predicted bandgap reference output voltage and the target voltage is determined. At 514, the trim parameters determined during the production test are adjusted based on the predicted error. The trimming process may comprise determining trim parameters such as a code indicative of resistance of a resistor ladder to change the bandgap reference output voltage by the error at the temperature. The code may be adjusted in discrete steps where each step corresponds to a predetermined voltage change ΔV. In an example, the trim parameters may be adjusted by a maximum number of discrete steps $n_{max}$ such that $n_{max}*\Delta V<\text{error}$ is satisfied. The code may be increased by $n_{max}$ steps or decreased by $n_{max}$ steps depending on whether the error is positive or negative. For example, if the error is positive meaning the bandgap reference output voltage is higher than the target voltage, then the code may be adjusted upward to increase resistance and decrease the bandgap reference output voltage. As another example, if the error is negative meaning the bandgap reference output voltage is lower than the target voltage, then the code may be downward to reduce resistance and increase the bandgap reference output voltage. Other variations are also possible. At 516, the bandgap reference circuit 108 is trimmed with the adjusted trim parameters. In an example, the bandgap reference circuit 108 arranged with the adjusted trim parameters may have an error between a bandgap reference output voltage and a target voltage which is less than the error before the bandgap reference circuit 108 is arranged with the adjusted trim parameters and less than the predetermined voltage change ΔV. Processing may then return back to step 506 after a period of time or the temperature sensed by the temperature sensor 102 changes by a certain amount. In other examples, a change in power dissipation of a chip or system having the bandgap reference circuit 108 may be measured which results in processing returning back to step 506.

Figure 6:
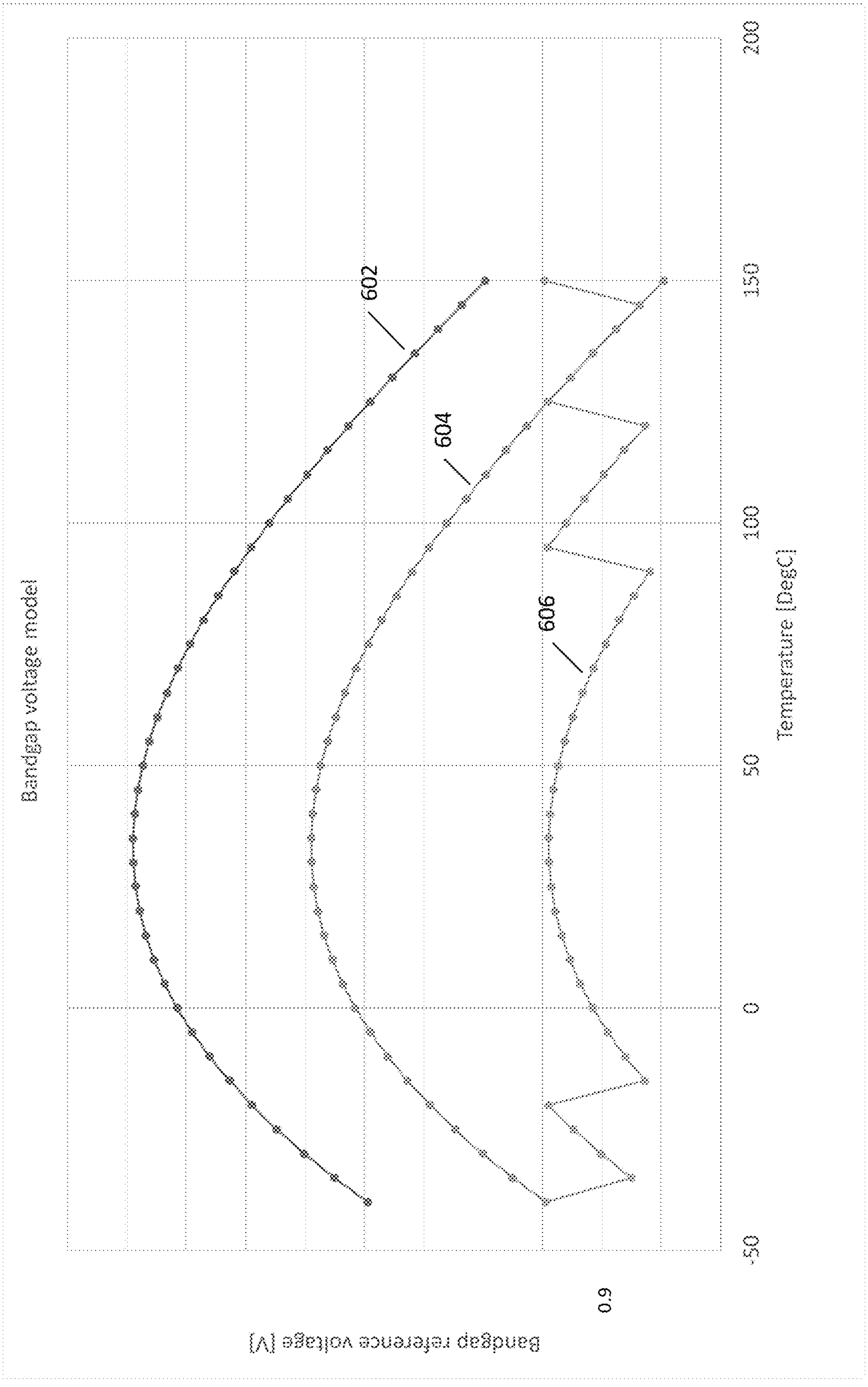
FIG. 6 illustrates example plots of a bandgap reference output voltage as a function of temperature associated with trimming the bandgap reference circuit during actual use based on the model in accordance with an exemplary embodiment of the invention.

FIG. 6 illustrates example plots 602, 604, 606 associated with trimming a bandgap reference circuit 108 based on the model 116 in accordance with an exemplary embodiment of the invention. The model 116 may be used to predict a bandgap reference circuit output voltage as a function of temperature. Plot 602 shows the prediction of the bandgap reference circuit output voltage as a function of temperature before trimming of the bandgap reference circuit 108 based on the model. In an example, the bandgap reference circuit 108 may be trimmed at the production test temperature. The plot 604 shows a prediction of a bandgap reference circuit output voltage as a function of temperature after the trimming. In an example, the plot 604 may be determined by shifting the plot 602 by an error between a bandgap reference circuit output voltage and the target voltage at the production test temperature. The plot 604 may be used to predict the error between a bandgap reference circuit output voltage and the target voltage at temperatures other than the production test temperature based on the bandgap reference circuit 108 being trimmed at the production test temperature. Each step in a trim parameter may result in a predetermined change in voltage output by the bandgap reference circuit 108. For example, a change of one step in the trim parameter may produce a 0.002 voltage change in a bandgap reference circuit output voltage. The plot 606 shows a bandgap reference circuit output voltage as a function of temperature after further trimming the bandgap reference circuit 108 based on the model 116 and plot 604. The bandgap reference circuit 108 may be trimmed not only at the production test temperature but at each temperature that the bandgap reference circuit 108 operates. Further, an error between the bandgap reference output voltage of plot 606 and the target voltage may be less than the predetermined voltage change ΔV which is 0.002 volts in this example.

In some examples, the bandgap reference circuit 108 may be trimmed during a calibration test instead of during the production test of the bandgap reference circuit 108. The trimming process may still require use of a known reference voltage so as to measure the bandgap reference output voltage and which may not be available during an actual use of the bandgap reference circuit 108.

In one embodiment, a method is disclosed. The method comprises: determining a first error between a bandgap reference output voltage of a bandgap reference circuit at a first temperature and a target voltage; measuring a second temperature of the bandgap reference circuit; predicting a bandgap reference output voltage of the bandgap reference circuit at the second temperature and based on the first error; determining a second error between the predicted bandgap reference output voltage and the target voltage; determining a trim parameter of the bandgap reference circuit based on the second error; and setting the bandgap reference circuit with the trim parameter, wherein a third error between a bandgap reference output voltage of the bandgap reference with the trim parameter is less than the second error. In an embodiment, the bandgap reference circuit is at the first temperature during a test where a known reference voltage is available to trim the bandgap reference circuit and at the second temperature during actual use of the bandgap reference circuit in a field where the known reference voltage is not available to trim the bandgap reference circuit. In an embodiment, the method further comprises trimming the bandgap reference circuit at the first temperature and wherein determining the trim parameter of the bandgap reference circuit based on the predicted bandgap reference output comprises adjusting a trim parameter of the test. In an embodiment, predicting the bandgap reference output voltage comprises inputting the second temperature into a model which outputs the predicted bandgap reference output voltage. In an embodiment, the model comprises a plurality of coefficients as a function of the first error. In an embodiment, the model comprises a nonlinear combination of parameters, where each parameters is a function of the first error and a power of the second temperature. In an embodiment, determining the trim parameter of the bandgap reference circuit comprises determining a number of discrete steps to adjust the trim parameter to cause the third error to be less than a predetermined voltage change associated with a step of the trim parameter. In an embodiment, the first error is measured before trimming the bandgap reference circuit. In an embodiment, the first error is stored in a flash memory or a one-time programmable memory. In an embodiment, the steps of predicting the bandgap reference output voltage of the bandgap reference circuit; determining the second error between the predicted bandgap reference output voltage and the target voltage; determining the trim parameter of the bandgap reference circuit based on the second error; and setting the bandgap reference are steps performed periodically. In an embodiment, the steps of predicting the bandgap reference output voltage of the bandgap reference circuit; determining the second error between the predicted bandgap reference output voltage and the target voltage; determining the trim parameter of the bandgap reference circuit based on the second error; and setting the bandgap reference are steps performed after detecting a change in power consumption or temperature of the bandgap reference circuit.

In another embodiment, a system is disclosed. The system comprises: first circuitry arranged to determine a first error between a bandgap reference output voltage of a bandgap reference circuit at a first temperature and a target voltage; second circuitry arranged to measure a second temperature of the bandgap reference circuit; third circuitry arranged to predict a bandgap reference output voltage of the bandgap reference circuit at the second temperature and based on the first error; fourth circuitry arranged to determine a second error between the predicted bandgap reference output voltage and the target voltage; fifth circuitry arranged to determine a trim parameter of the bandgap reference circuit based on the second error; and sixth circuitry arranged to set the bandgap reference circuit with the trim parameter, wherein a third error between a bandgap reference output voltage of the bandgap reference with the trim parameter is less than the second error. In an embodiment, the bandgap reference circuit is at the first temperature during a test where a known reference voltage is available to trim the bandgap reference circuit and at the second temperature during actual use of the bandgap reference circuit in a field where the known reference voltage is not available to trim the bandgap reference circuit. In an embodiment, the system further comprises seventh circuitry arranged to trim the bandgap reference circuit at the first temperature and wherein the fifth circuitry arranged to determine the trim parameter of the bandgap reference circuit based on the predicted bandgap reference output comprises adjusting a trim parameter of the test. In an embodiment, the third circuitry arranged to predict the bandgap reference output voltage comprises inputting the second temperature into a model which outputs the predicted bandgap reference output voltage. In an embodiment, the model comprises a plurality of coefficients as a function of the first error. In an embodiment, the model comprises a nonlinear combination of parameters, wherein each parameter is a function of the first error and a power of the second temperature. In an embodiment, the fifth circuitry arranged to determine the trim parameter of the bandgap reference circuit comprises determining a number of discrete steps to adjust the trim parameter to cause the third error to be less than a predetermined voltage change associated with a step of the trim parameter. In an embodiment, the first error is measured before trimming the bandgap reference circuit. In an embodiment, the first error is stored in a flash memory or a one-time programmable memory.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method comprising: determining a first error between a bandgap reference output voltage of a bandgap reference circuit at a first temperature and a target voltage; measuring a second temperature of the bandgap reference circuit; predicting the bandgap reference output voltage of the bandgap reference circuit at the second temperature and based on the first error; determining a second error between the predicted bandgap reference output voltage and the target voltage; determining a trim parameter of the bandgap reference circuit based on the second error; and setting the bandgap reference circuit with the trim parameter, wherein a third error between the bandgap reference output voltage of the bandgap reference with the trim parameter is less than the second error.

2. The method of claim 1, wherein the bandgap reference circuit is at the first temperature during a test where a known reference voltage is available to trim the bandgap reference circuit and at the second temperature during actual use of the bandgap reference circuit in a field where the known reference voltage is not available to trim the bandgap reference circuit.

3. The method of claim 2, further comprising trimming the bandgap reference circuit at the first temperature and wherein determining the trim parameter of the bandgap reference circuit based on the predicted bandgap reference output comprises adjusting a trim parameter of the test.

4. The method of claim 1, wherein predicting the bandgap reference output voltage comprises inputting the second temperature into a model which outputs the predicted bandgap reference output voltage.

5. The method of claim 4, wherein the model comprises a plurality of coefficients as a function of the first error.

6. The method of claim 4, wherein the model comprises a nonlinear combination of parameters, where each parameters is a function of the first error and a power of the second temperature.

7. The method of claim 1, wherein determining the trim parameter of the bandgap reference circuit comprises determining a number of discrete steps to adjust the trim parameter to cause the third error to be less than a predetermined voltage change associated with a step of the trim parameter.

8. The method of claim 1, wherein the first error is measured before trimming the bandgap reference circuit.

9. The method of claim 1, wherein the first error is stored in a flash memory or a one-time programmable memory.

10. The method of claim 1, wherein the steps of predicting the bandgap reference output voltage of the bandgap reference circuit; determining the second error between the predicted bandgap reference output voltage and the target voltage; determining the trim parameter of the bandgap reference circuit based on the second error; and setting the bandgap reference are steps performed periodically.

11. The method of claim 1, wherein the steps of predicting the bandgap reference output voltage of the bandgap reference circuit; determining the second error between the predicted bandgap reference output voltage and the target voltage; determining the trim parameter of the bandgap reference circuit based on the second error; and setting the bandgap reference are steps performed after detecting a change in power consumption or temperature of the bandgap reference circuit.

12. A system comprising: first circuitry arranged to determine a first error between a bandgap reference output voltage of a bandgap reference circuit at a first temperature and a target voltage; second circuitry arranged to measure a second temperature of the bandgap reference circuit; third circuitry arranged to predict the bandgap reference output voltage of the bandgap reference circuit at the second temperature and based on the first error; fourth circuitry arranged to determine a second error between the predicted bandgap reference output voltage and the target voltage; fifth circuitry arranged to determine a trim parameter of the bandgap reference circuit based on the second error; and sixth circuitry arranged to set the bandgap reference circuit with the trim parameter, wherein a third error between the bandgap reference output voltage of the bandgap reference with the trim parameter is less than the second error.

13. The system of claim 12, wherein the bandgap reference circuit is at the first temperature during a test where a known reference voltage is available to trim the bandgap reference circuit and at the second temperature during actual use of the bandgap reference circuit in a field where the known reference voltage is not available to trim the bandgap reference circuit.

14. The system of claim 13, further comprising seventh circuitry arranged to trim the bandgap reference circuit at the first temperature and wherein the fifth circuitry arranged to determine the trim parameter of the bandgap reference circuit based on the predicted bandgap reference output comprises adjusting a trim parameter of the test.

15. The system of claim 12, wherein the third circuitry arranged to predict the bandgap reference output voltage comprises inputting the second temperature into a model which outputs the predicted bandgap reference output voltage.

16. The system of claim 15, wherein the model comprises a plurality of coefficients as a function of the first error.

17. The system of claim 15, wherein the model comprises a nonlinear combination of parameters, wherein each parameter is a function of the first error and a power of the second temperature.

18. The system of claim 12, wherein the fifth circuitry arranged to determine the trim parameter of the bandgap reference circuit comprises determining a number of discrete steps to adjust the trim parameter to cause the third error to be less than a predetermined voltage change associated with a step of the trim parameter.

19. The system of claim 12, wherein the first error is measured before trimming the bandgap reference circuit.

20. The system of claim 12, wherein the first error is stored in a flash memory or a one-time programmable memory.

* * * * *